(12) United States Patent
Qaadri et al.

(10) Patent No.: US 11,025,502 B2
(45) Date of Patent: Jun. 1, 2021

(54) SYSTEMS AND METHODS FOR USING MACHINE LEARNING TECHNIQUES TO REMEDIATE NETWORK CONDITIONS

(71) Applicant: Verizon Patent and Licensing Inc., Arlington, VA (US)

(72) Inventors: Hayder Qaadri, Lanham, MD (US); Melissa Delmonico, Toms River, NJ (US); Lakshmi Panguluri, Temple Terrace, FL (US); Akhil Dayal, Warren, NJ (US); Ivan C. Berg, Glen Cove, NY (US); Meeta Vij, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/597,692

(22) Filed: Oct. 9, 2019

(65) Prior Publication Data
US 2021/0111966 A1  Apr. 15, 2021

(51) Int. Cl.
*H04L 12/24* (2006.01)
(52) U.S. Cl.
CPC .......... *H04L 41/16* (2013.01); *H04L 41/0636* (2013.01); *H04L 41/0654* (2013.01)
(58) Field of Classification Search
CPC .. H04L 41/16; H04L 41/0636; H04L 41/0654
See application file for complete search history.

(56) References Cited

U.S. PATENT DOCUMENTS

| | | | | |
|---|---|---|---|---|
| 7,428,300 B1* | 9/2008 | Drew | ................... | H04M 3/2254 379/14.01 |
| 9,753,800 B1* | 9/2017 | Jadunandan | ........ | H04L 41/5067 |
| 10,313,179 B1* | 6/2019 | Douberly | .............. | H04L 41/046 |
| 2014/0133844 A1* | 5/2014 | Dahlfort | ............ | H04B 10/0771 398/10 |
| 2015/0288557 A1* | 10/2015 | Gates | .................. | G06F 11/3082 714/37 |
| 2019/0281476 A1* | 9/2019 | Lyon | ........................ | G06N 3/08 |

\* cited by examiner

*Primary Examiner* — Azizul Choudhury (57) ABSTRACT

A system described herein may use automated techniques, such as machine learning techniques, to identify network events (e.g., based on user-submitted reports and/or system-generated alerts). The system may identify a type and/or attributes of the network event, and may identify past network events that share the same or similar attributes. An estimated time to remediate the network event, and/or one or more remedial measures, may be determined and implemented based on remediation measures taken to remediate the past network events. The determined remedial measures may include one or more temporary remedial measures effected until a permanent solution is put into place. Users who are affected, or who are likely to be affected, may be contacted to indicate the estimated remediation time. Feedback may be used to refine the estimation and/or remediation for future similar network events.

20 Claims, 6 Drawing Sheets

SYSTEMS AND METHODS FOR USING MACHINE LEARNING TECHNIQUES TO REMEDIATE NETWORK CONDITIONS

BACKGROUND

Telecommunications network providers utilize various different types of equipment to implement infrastructure needed to provide service to users. The different types of equipment may include physical fibers, routers, switches, and the like. Damage to the equipment, such as severed fibers, and/or other types of malfunctions may cause service disruptions for users.

DETAILED DESCRIPTION OF THE PREFERRED EMBODIMENTS

The following detailed description refers to the accompanying drawings. The same reference numbers in different drawings may identify the same or similar elements.

Embodiments described herein may provide for a system that utilizes machine learning and other automated techniques to identify network events that may cause connectivity issues for users, estimate remediation time of the network events, and automatically initiate the remediation of the network events. The techniques described herein may result in faster remediation of network events, autonomous remediation or triage of network events, and may utilize fewer resources than prior techniques.

Figure 1:
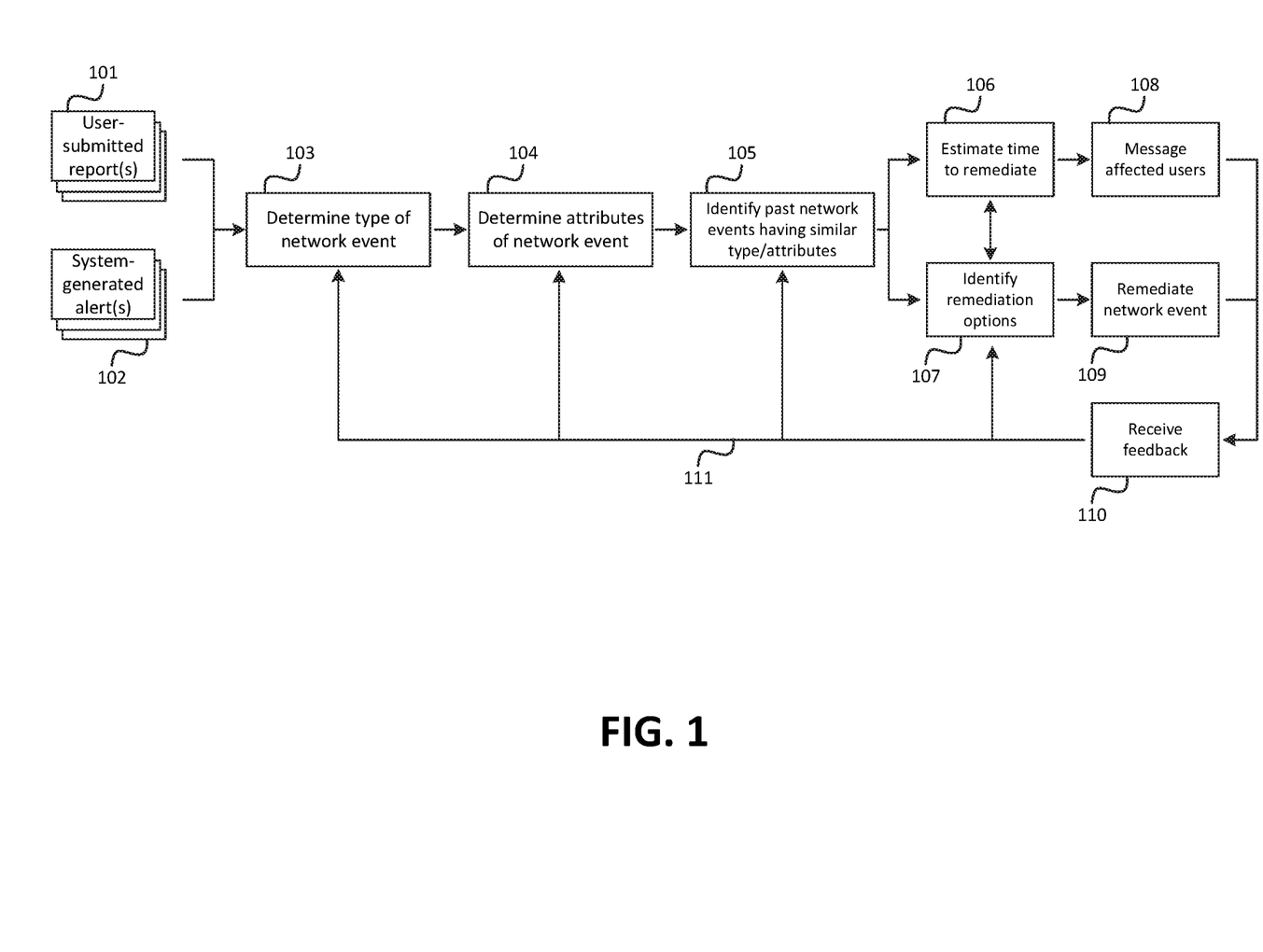
FIG. 1 illustrates an example embodiment described herein, in which machine learning techniques may be used to identify a network event and automatically initiate remediation of the network event.

FIG. 1 conceptually illustrates, for example, how an Intelligent Reporting and Remediation System ("IRRS"), in accordance with some embodiments, may use machine learning and/or other automated techniques to identify a network event, report the network event to affected users along with an estimated remediation time, and initiate remediation of the network event. For example, as shown, the IRRS may receive one or more user-submitted reports 101 and/or system-generated alerts 102. User-submitted reports 101 may include, for example, support tickets submitted by users indicating a particular connectivity issue (e.g., Internet gateway not providing connectivity, mobile telephone unable to access wireless network, etc.) and/or other reports submitted by users. System-generated alerts 102 may include, for example, alerts that indicate that a given device or system is unreachable or is malfunctioning, and/or other types of alerts that indicate a connectivity issue. System-generated alerts 102 may be generated based on, for example, a configuration of one or more network devices that perform network tests or diagnostics (e.g., on a periodic, intermittent, and/or some other type of repeated basis) in order to determine whether a given device or system is operating properly.

The IRRS may determine (at 103) the type of network event based on the user-submitted reports 101 and/or system-generated alerts 102. Additionally, or alternatively, the IRRS may identify a subset of potential types of network events based on reports 101 and alerts 102, from a set of candidate types of network events. Reports 101 and/or alerts 102 may, in some scenarios, include a description or other indication of the type of event.

In other scenarios, reports 101 and/or alerts 102 may include information based on which the type of event can be determined. For example, reports 101 and/or alerts 102 may indicate that a group of wireless devices within the same geographic area lost connectivity within one minute of each other. In this example, the IRRS may determine that the type of network event is malfunction of a base station of a radio access network ("RAN"). In some embodiments, the IRRS (and/or some other system or device) may perform further analysis based on reports 101 and/or alerts 102 to determine the event. Continuing with the above example, the IRRS may perform one or more diagnostics to test one or more components of a base station that has a coverage area that coincides with reports 101 and/or alerts 102, to determine the specific type of network event. That is, reports 101 and/or alerts 102 may allow for a general determination of the type of network event, and the further analysis (e.g., the further analysis that is predicated upon the initial general determination) may provide more specific details of the network event. For example, the general determination of the network event may reveal that a base station is experiencing some sort of malfunction, and the further analysis may reveal that a particular radio of the base station is not sending or receiving radio frequency ("RF") signals.

The IRRS may determine (at 104) attributes of the network event. Different types of network events may have different attributes, as described in greater detail below with respect to the examples provided in FIGS. 2 and 3. For instance, attributes such as geographical locations of users that submit reports 101, geographical locations of devices or systems that have been determined (at 103) to be associated with the network event, whether the devices or systems are owned and/or operated by a third party (e.g., a party separate from an entity that owns and/or operates the IRRS), performance metrics associated with one or more devices or systems, or the like.

The IRRS may further identify (at 105) past network events having the same type and/or one or more of the same attributes as the determined network event. For example, the IRRS may maintain or access an information repository that includes a historical log and/or other information regarding attributes of past network events. For example, the IRRS may identify past instances of the same type of network event, and may further identify past instances which are more similar to the present network event than other past instances. For example, a first past instance of the type of network event that occurred closer, geographically, to the present network event may be considered "more similar" to the present network event than a second past instance of the type of network event that occurred farther away. In some embodiments, the IRRS may score the past instances of network events to indicate similarity to the present network event using regression analysis, pattern-matching, machine learning techniques (e.g., which may be used to determine a degree of similarity between attributes), and/or other techniques.

The IRRS may additionally estimate (at 106) an amount of time needed to remediate the network event. For example, the IRRS may estimate the amount of time needed to remediate the network event based on how much time was expended to remediate one or more the past similar network events. In some embodiments, the estimation may be based on weighting or other operations that reflect the similarity of the past similar network events. For example, if a first past network event is relatively similar and took one hour to remediate, and further if a second past network event is less similar to the present network event than the first past network event, and took one day to remediate, the IRRS may determine an estimate for the present network event that is closer to one hour than one day.

The IRRS may also identify (at 107) one or more remediation options for the network event. The remediation options may include one or more remedial measures to be taken to remedy the network event (e.g., restore connectivity, in scenarios where the network event caused a loss of connectivity). In some embodiments, the remediation options may be determined based on the attributes of the network event and/or information regarding the remediation of past network events of the same type. As similarly discussed above, similarity of the past network events may be a factor in determining what remedial measure(s) the IRRS selects.

In some embodiments, the time to remediate the network event may be estimated (at 106) and the remedial measure(s) to be taken may be identified (at 107) as part of the same process. For example, in some embodiments, the estimated time necessary for a given remedial measure may be a factor that affects whether the remedial measure is selected, and/or may affect a ranking or scoring of the remedial measure (e.g., where the rankings or scoring of different remedial measures are used to select one or more highest scoring remedial measures to implement). In some embodiments, the time to remediate the network event may be estimated (at 106) after the remediation options are identified (at 107). In some embodiments, the time to remediate the network event may be estimated (at 106) as a separate process from the identification (at 107) of the remediation options.

The IRRS may message (at 108) users who are, or may potentially be, affected by the network event. For example, the IRRS may access one or more data repositories and/or implement one or more application programming interfaces ("APIs") to communicate with devices or systems of the network to identify potentially affected users. For example, the IRRS may identify users who are located within a threshold geographical proximity to a geographical area associated with the network event, users who are subscribed to a same type of service as a network service associated with the network event (e.g., cable television service, wireless telecommunications service, Internet service, etc.), users who are associated with an affected account (e.g., where a given account may be associated with network services in a physical space such as a building, and/or with network services provided to a particular set of devices or users, etc.), users who have submitted reports 101, and/or other affected (or potentially affected) users.

In some embodiments, the IRRS may identify an account or subscriber information associated with the affected (or potentially affected users), in order to identify contact information for the affected users. For example, while the network event may affect one device associated with a user (e.g., a television set-top box), the network event may not affect another type of device associated with the user (e.g., a mobile telephone). As another example, the same device may experience one type of network event, while still being able to be contacted in some other way (e.g., the device may not have connectivity via a cellular RAN, but may have WiFi connectivity). The IRRS may identify contact information for the user (e.g., a telephone number via which the user's mobile telephone can be reached), such that the user can be contacted regarding the network event. That is, for example, the IRRS may identify contact information for the user (or a device associated with the user) such that the user can be contacted via a suitable communication pathway that is separate from the network event.

In some embodiments, the set of affected users may include users who are not presently affected, but have some likelihood of becoming affected prior to the estimated remediation time. For example, assume that the network event is associated with a given geographical area, and that a particular User Equipment ("UE") (e.g., a mobile telephone) is located outside the geographical area. Further assume that the UE is traveling on a path toward the geographical area and, based on its speed and direction, may potentially enter the geographical area prior to the estimated remediation time. In this situation, the IRRS may identify the UE as being potentially affected, and may message (at 108) the UE, indicating the affected area, the type of network event, and the estimated remediation time.

The IRRS may also initiate (at 109) the remediation of the network event. In some embodiments, the IRRS may select a highest-scoring remediation option (e.g., in situations where multiple remediation options were identified), and/or may select multiple remediation options (e.g., the top scoring remediation options). In situations where the remediation option includes human intervention (e.g., if a technician is required to perform a repair or replacement), the IRRS may message a dispatch center, technician, and/or other entity in order to provide a notification of the network event and the selected remediation measure.

In some embodiments, the selected remediation measure(s) may include an automated remediation measure, such as performing a reconfiguration of a one or more network components. In such scenarios, the IRRS may communicate with the one or more network components via one or more APIs or interfaces, in order to provide configuration instructions to reconfigure the one or more network components. In some embodiments, this reconfiguration may be temporary (e.g., may last as long as the estimated time to remediate). Thus, when providing reconfiguration instructions to the network components, the IRRS may specify a duration of the reconfiguration, after which the one or more network components may revert back to a previous configuration. In some embodiments, the IRRS may provide configuration instructions, after the elapse of the estimated time to remediate, to revert back to the previous configuration. In some embodiments, the IRRS may provide configuration instructions, after receiving information indicating that the network event has been remediated, to revert back to the previous configuration.

The IRRS may also receive (at 110) feedback regarding the remediation of the network event and/or the messaging of the affected users, and may use (at 111) this feedback in one or more of the operations 103-109 discussed above. For example, the IRRS may continue to monitor user-submitted reports 101 and/or system-generated alerts 102 to determine whether the same network event is reported. If the same network event is still being reported after the estimated time to remediate has lapsed, the IRRS may determine that the estimated time was too short, and that future network events sharing the same or similar attributes may be associated with a higher time to remediate than the time that was estimated (at 106). As another example, the IRRS may store information indicating that the remedial measure (selected at 107) took longer than estimated, which may impact the selection of the same remedial measure in the future (e.g., for network events that share the same or similar attributes, and/or for other network events).

In some situations, the feedback may indicate that the type and/or the attributes of the network event were determined (at 103 and/or 104) incorrectly. For example, if the actual time to remediate took significantly longer than estimated (e.g., at least a threshold amount of time greater), if a technician or operator indicates that the network event is actually of a different type than determined (at 103), if the actual remedial measure that was taken differed from the remedial measures (identified at 107), etc., the IRRS may store information indicating that the type and/or attributes of the network event were determined (at 103 and/or 104) incorrectly. For example, if the type of network event was determined (at 103) based on one or more keywords included in reports 101 and/or alerts 102, a score, weight, and/or other feature that associates the keywords with the incorrectly determined network event may be adjusted to reduce the likelihood of erroneously identifying the network event when these keywords are present in reports 101 and/or alerts 102.

As another example, the IRRS may receive (at 110) an indication (e.g., via user-submitted reports 101, system-generated alerts 102, system diagnostics, an indication from a technician who performed a repair, etc.) when the network event is remediated. As similarly mentioned above, the IRRS may refine future time estimates based on the actual time to remediate. In some embodiments, the IRRS may further store information indicating that the remedial measure (selected at 107) was an effective remedial measure, and should be used for future network events of the same or similar type, and/or with same or similar attributes. Further, the IRRS may store information indicating that the determination (at 103) of the type of network event was accurate based on the indication that the network event was remediated.

In some embodiments, the IRRS may consider (at 110) the lack of reports 101 and/or alerts 102 as feedback. For example, the IRRS may determine that, after the estimated time to remediate the network event, no further reports 101 or alerts 102 were received for the network event, and/or reports 101 or alerts 102 regarding the network event have declined. Through the ongoing refinement based on feedback, the IRRS may continue to improve the time estimation of remediation of network conditions, and the determination of remedial measures to take.

Figure 2:
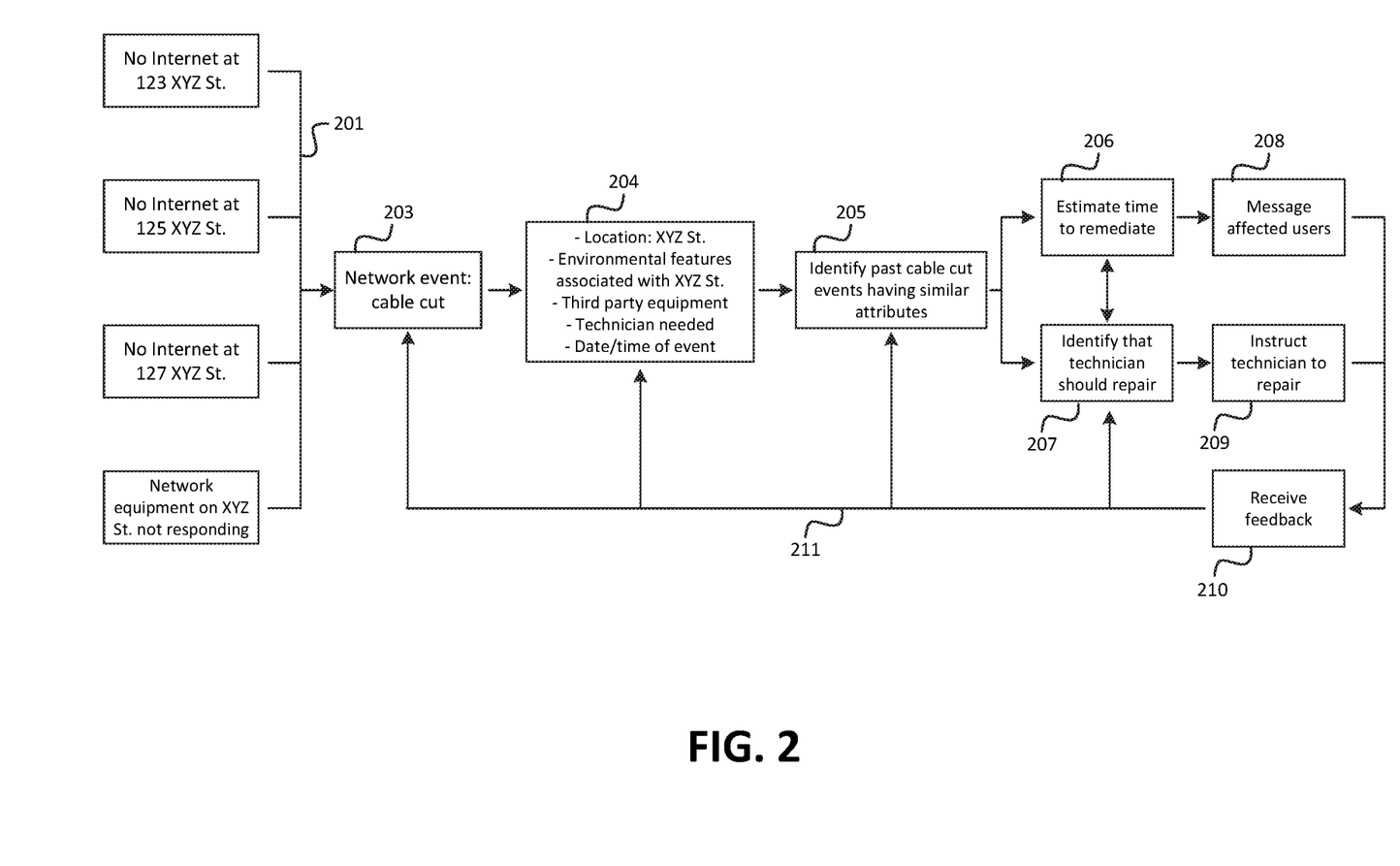
FIG. 2 illustrates an example embodiment described herein, in which machine learning techniques may be used to identify a "cable cut" type of network event and automatically initiate remediation of the network event.

FIG. 2 illustrates an example of the IRRS remediating a "cable cut" type of network event, in which a physical fiber may have been severed (e.g., by errant digging, an animal chewing on the fiber, etc.). The IRRS may receive (at 201) user-submitted reports and/or system-generated alerts. For example, the IRRS may receive three user-submitted reports indicating that Internet connectivity is unavailable at 123 XYZ St., 125 XYZ St., and 127 XYZ St. (e.g., three houses on the same street). The IRRS may also receive a system-generated alert, and/or may perform a diagnostic based on the user-submitted reports, to determine that network equipment on XYZ St. is not responding. In some embodiments, a location (e.g., an approximate location) of the cable cut may be determined via Optical Time Domain Reflectometer ("OTDR") testing and/or some other suitable technique.

Based on the reports and/or alerts, the IRRS may determine (at 203) that the type of the network event is a cable cut. For instance, the proximity of the reporting users to each other, the type of connectivity issue (e.g., no Internet connectivity), and the fact that network equipment in proximity to the users is not responding, may indicate that physical signals are unable to reach these users or equipment, which may be due to a cable cut. In some embodiments, the IRRS may use other types of information to determine the type of network event. For example, the IRRS may receive images or video from a traffic camera that shows an individual or machine digging at a location near a known location of a physical fiber, and may use image recognition and/or other techniques to identify what the images or video depict. As another example, the IRRS may receive weather reports, which may indicate storms, flooding, or other weather phenomena which may cause (or otherwise be associated with) the network event.

The IRRS may further determine (at 204) attributes of the network event. As mentioned above, different types of network events may be associated with different attributes. The IRRS may store a lookup table and/or other data structure that associates different network events with their attributes. In this example, the IRRS may determine a location (e.g., a geographical area or region) associated with the network event. In this example, the IRRS may determine that the location is at XYZ St. While not explicitly shown in the figure, the IRRS may determine a relatively precise location based on the information received (at 201), such as longitude and latitude coordinates that define a region at which 123 XYZ St., 125 XYZ St., and 127 XYZ St. are located.

The IRRS may additionally identify environmental features associated with the network event. The environmental features may indicate, for example, hills, valleys, roads, fences, and/or other features. The IRRS may also identify whether the cut cable is owned and/or operated by the same entity that provides the Internet service, or if the cable is leased from a third party. The IRRS may also determine that cable cut network events require a technician to physically repair the cut cable. The IRRS may further determine a date and/or time of the event. The IRRS may, for instance, access a data repository that indicates these attributes, and/or obtain the information from one or more other sources. As described below, the determined attributes may affect the estimated time to remediate the event, and/or may affect the selection of an appropriate remedial measure.

The IRRS may further identify (at 205) past cable cut network events with similar attributes. For example, the IRRS may identify past cable cut network events that occurred in the same or similar geographical region (e.g., on the same street, in the same city, in the same state or province, etc.), cable cut events that occurred at a similar time (e.g., the same time of day, the same day of week, the same month, the same season, etc.), cable cut events owned by the same owner as the present cable (e.g., potential third parties), and/or other attributes.

The IRRS may estimate (at 206) the time to remediate the cable cut network event. For example, the IRRS may determine how long it took to remediate the past cable network events with the same and/or similar attributes. The degree of similarity of the past cable cut events may impact the range or confidence of the estimated remediation time. For example, if the IRRS identifies a past cable cut with nearly identical attributes, the estimate for the remediation of the present cable cut event may be based heavily on the time taken to remediate the previous cable cut event, and/or the range of estimated time may be relatively low (e.g., the IRRS may estimate a time with a relatively low margin of error, such as an estimate of 3-4 hours to remediate). On the other hand, if the IRRS identifies a past cable cut with relatively similar, but not identical, attributes, the estimate for the remediation of the present cable cut event may be based less heavily on the time taken to remediate the previous cable cut event, and/or the range of estimated time may be relatively high (e.g., the IRRS may estimate a time with a relatively high margin of error, such as an estimate of 2-6 hours to remediate).

The IRRS may also determine (at 207) that a technician should repair the cable cut. For example, the IRRS may make this determination based on the attribute indicating that a technician is needed to perform the repair. As another example, the IRRS may determine that one or more past cable cut network events were remediated via a technician performing a repair. In some embodiments, the IRRS may determine or modify (at 206) the estimated time to repair based on determining that a technician is needed to perform the repair. For example, the IRRS may determine the availability of technicians to perform the repair (e.g., technicians within geographical proximity to the cable cut, and/or technicians who have availability on a work schedule, technicians with qualifications and/or certifications to perform the repair, etc.). The estimate may, for example, be increased when no technicians are available within a threshold proximity to the cable cut, and may be decreased when one or more technicians are available within the threshold proximity to the cable cut.

The IRRS may message (at 208) affected users, indicating the estimated time to remediate the network condition. For example, the IRRS may receive contact information (e.g., telephone numbers, email addresses, social media handles, etc.) regarding the users at 123 XYZ St., 125 XYZ St., and 127 XYZ St. from a data repository (e.g., Home Subscriber Server ("HSS"), a Unified Data Management ("UDM") function, etc.) associated with a service provider who provides the network service.

The IRRS may also identify one or more other users, who have not submitted a report but who may still be affected. For example, the IRRS may identify other users whose Internet service is, or is likely, affected by the cable cut, and may notify these users using their contact information. The IRRS may identify these users based on information (e.g., subscriber information stored by an HSS, UDM, and/or some other device or system) indicating that an address associated with these other users is geographically proximate (e.g., within a threshold distance) of the network event. As another example, the IRRS may identify a social media community or "neighborhood" online message board associated with the geographical location of the network event (e.g., if the network event affects users in a particular neighborhood, the IRRS may identify a message board associated with the neighborhood) and create a post (e.g., a publicly visible post, or a post visible to members of the community or message board) indicating the estimated remediation time.

The IRRS may also instruct (at 209) a selected technician to perform the repair of the cable cut. For example, as mentioned above, the IRRS may have selected a most suitable technician based on proximity of available technicians to the cable cut, expertise or certifications of the available technicians, etc.

In some embodiments, in conjunction with performing the remediation (e.g., instructing the technician at 209), the IRRS may perform a "temporary" remediation (e.g., a remedial measure that lasts for the estimated time to remediate the network event). For example, the IRRS may cause network traffic to be re-routed (e.g., to a path that circumvents the cut cable), may cause a set of temporary fibers to be used for the duration of the network event, etc. For example, the IRRS may include, with an instruction to re-route the network traffic and/or to use the temporary fibers, a duration or end time that specifies how long the temporary remedial measure should be performed. Additionally, or alternatively, the IRRS may send an instruction, after expiration of the estimated time, to revert the adjustment (and/or an indication that the adjustment is no longer necessary), and/or the IRRS may send the instruction to revert the adjustment only after determining (e.g., after receiving feedback at 210) that the network event has been remediated.

The IRRS may receive (at 210) feedback regarding the remediation and refine (at 211) one or more determination processes (e.g., at 203-207) based on the feedback. For example, if the estimated time to remediate was 3-4 hours and the actual repair time was 2 hours, the IRRS may store information indicating that this type of network event (i.e., a cable cut), having the parameters (identified at 204) took 2 hours to remediate. In some embodiments, the IRRS may store information associated with the technician who performed the repair, indicating that the repair by the technician took less time than estimated. In the future, this information may be used to determine the expertise or efficiency of the technician, which may cause this technician to be selected over other (e.g., slower) technicians for future repairs. The IRRS may further use the feedback in other suitable ways, as described above with respect to FIG. 1.

Figure 3:
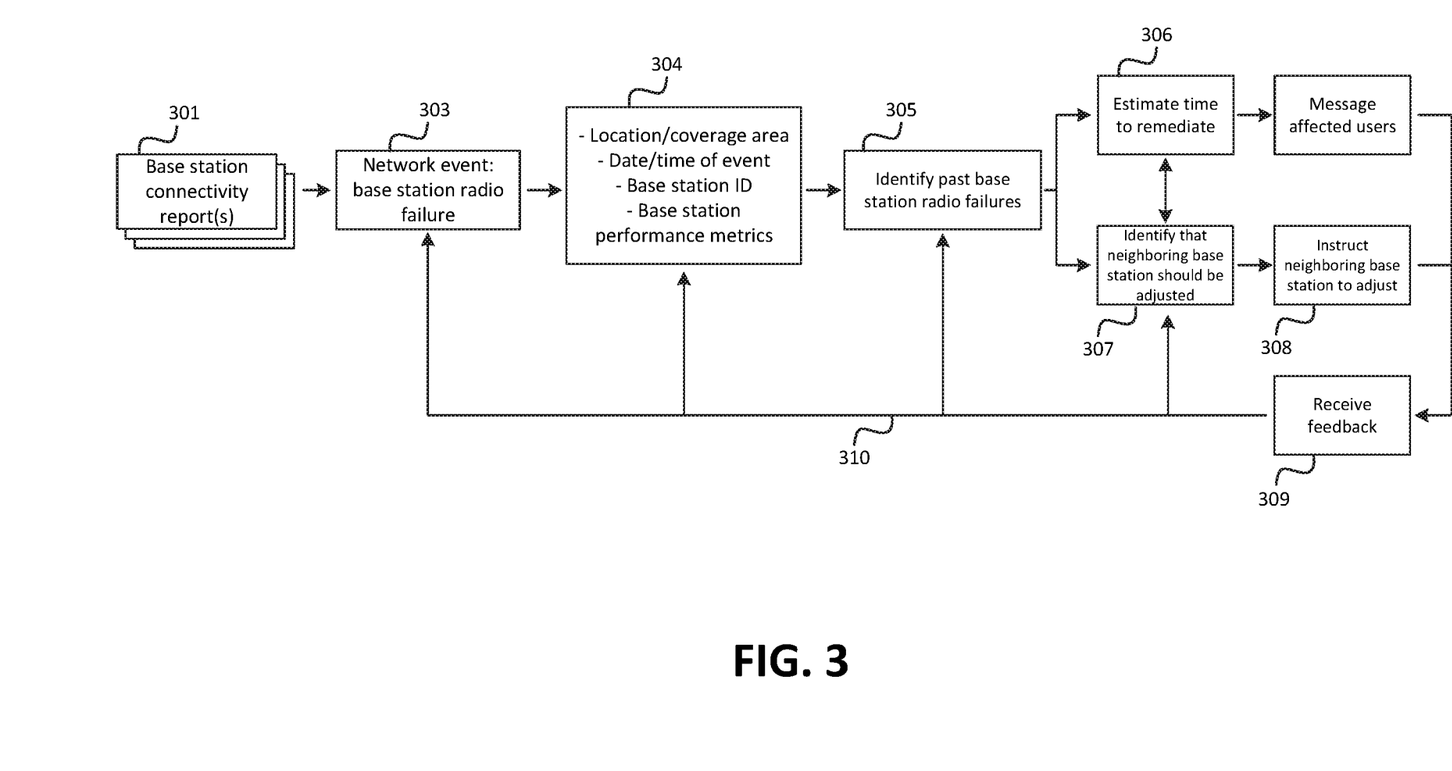
FIG. 3 illustrates an example embodiment described herein, in which machine learning techniques may be used to identify a network event relating to a failed hardware device and automatically initiate remediation of the network event.

FIG. 3 illustrates an example of the IRRS remediating a "base station radio failure" type of network event. As shown, the IRRS may receive one or more base station connectivity reports 301. These reports may be, for example, system-generated alerts and/or results of routine diagnostics or monitoring, reports from UEs that have detected connectivity issues, etc. Reports 301 may indicate connectivity issues with a base station, such as inability to wirelessly connect (or "attach") to a base station, inability to wirelessly connect to the base station at a particular frequency band, excessive latency or packet loss, reduced throughput (e.g., compared to an expected throughput, lower throughput than a threshold throughput, etc.), and/or other connectivity issues with a particular base station. Based on the information in reports 301, the IRRS may determine (at 303) that the network event is a base station radio failure.

The IRRS may determine (at 304) attributes related to the base station failure network event. For example, the IRRS may identify a location of the base station, a coverage area associated with the base station, one or more identifiers of the base station (e.g., a "Cell ID" and/or another identifier), base station performance metrics, and/or other attributes. The base station performance metrics may include, for example, reports (e.g., signal strength measurement reports, signal-to-interference and noise ("SINR") measurement reports, throughput and/or latency reports, etc.) from the base station, from UEs attached to the base station, and/or from one or more other devices or systems associated with the network. The IRRS may also identify (at 305) one or more past base station radio failures having the same or similar attributes, and may estimate (at 306) a time to remediate the base station radio failure (e.g., based on the attributes of the base station failure, and/or the time to remediate past base station failures having the same or similar attributes).

The IRRS may also identify (at 307) one or more remedial measures, including adjusting parameters of a neighboring base station. For example, the IRRS may determine that another base station has a coverage area that overlaps some or all of the coverage area of the base station experiencing the radio failure, and may instruct (at 308) the neighboring base station to adjust directionality and/or power of one or more radios to compensate for the base station experiencing the radio failure. For example, the IRRS may communicate with one or more devices or systems of the network to identify the neighboring base station, and may communicate with the neighboring base station (e.g., via one or more APIs and/or interfaces) to instruct the neighboring base station to perform the adjustment.

In some embodiments, the adjustment may be temporary, based on the estimated remediation time. For example, the IRRS may include, with the instruction, a duration or end time that specifies how long the neighboring base station should perform the adjustment. Additionally, or alternatively, the IRRS may send an instruction, after expiration of the estimated time, to revert the adjustment (and/or an indication that the adjustment is no longer necessary). Additionally, or alternatively, the IRRS may send the instruction to revert the adjustment only after determining (e.g., after receiving feedback at 309) that the network event has been remediated.

In some embodiments, the IRRS may identify (at 307) multiple remedial measures, of which performing an adjustment at the neighboring base station may be one remedial measure. For example, the IRRS may also identify that a technician should be dispatched to repair the base station, that an instruction should be sent to the base station to restart one or more systems or components, and/or one or more other remedial measures. The IRRS may, accordingly, initiate the performance of these other remedial measures.

The IRRS may receive (at 309) feedback regarding the remedial measure(s). For example, the IRRS may determine whether UEs, which were affected by the radio failure, continue to be affected after instructing (at 308) the neighboring radio station to perform the adjustment. This determination may be based on, for example, measurement reports from the UEs, user-submitted reports from users associated with the UEs, performance information (e.g., indicating performance metrics associated with the base station) from one or more devices or systems of the network, and/or other suitable information received by the IRRS. The received feedback may be used by the IRRS to refine (at 310) one or more of the determination processes 303-307 discussed above.

Figure 4:
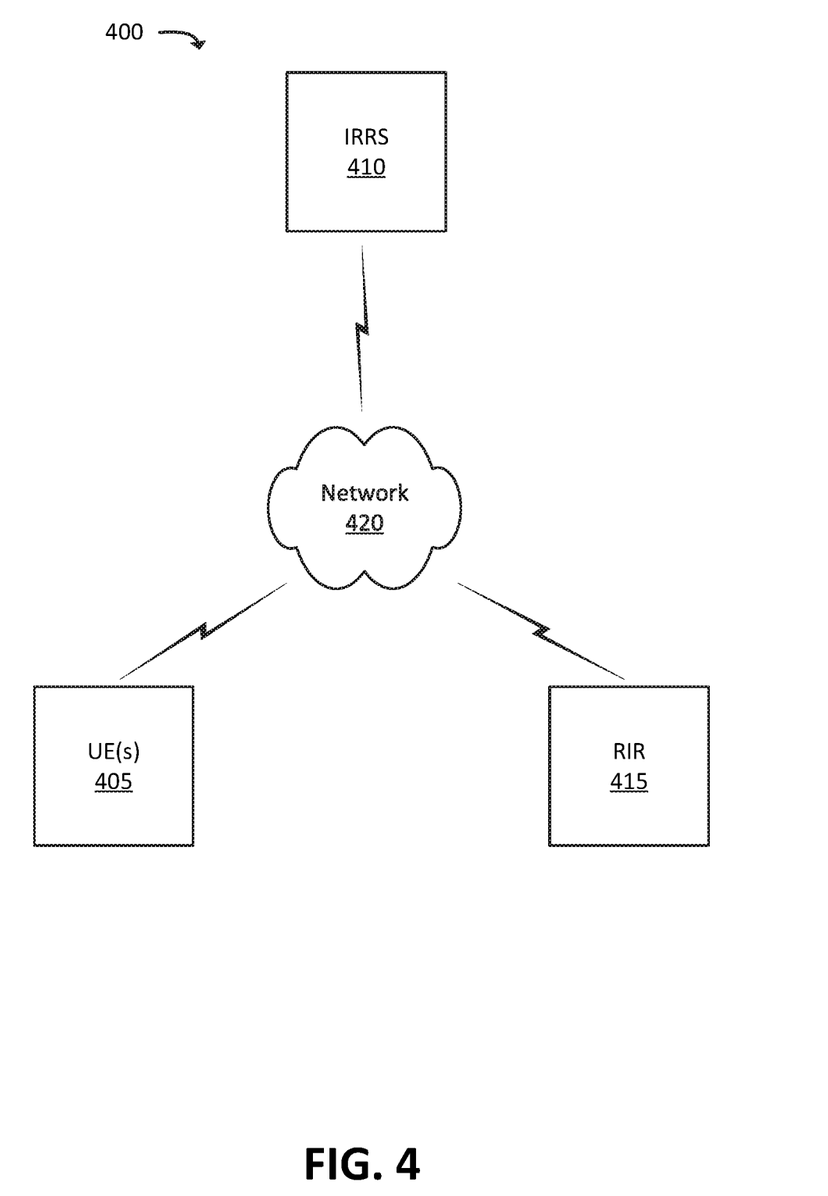
FIG. 4 illustrates an example environment in which one or more embodiments, described herein, may be implemented.

FIG. 4 illustrates an example environment 400, in which one or more embodiments, described herein, may be implemented. As shown in FIG. 4, environment 400 may include one or more UEs 405, IRRS 410, remediation information repository ("RIR") 415, and network 420. The quantity of devices and/or networks, illustrated in FIG. 4, is provided for explanatory purposes only. In practice, environment 200 may include additional devices and/or networks; fewer devices and/or networks; different devices and/or networks; or differently arranged devices and/or networks than illustrated in FIG. 4. For example, while not shown, environment 400 may include devices that facilitate or enable communication between various components shown in environment 400, such as routers, modems, gateways, switches, hubs, etc. Alternatively, or additionally, one or more of the devices of environment 400 may perform one or more functions described as being performed by another one or more of the devices of environments 400. Devices of environment 400 may interconnect with each other and/or other devices via wired connections, wireless connections, or a combination of wired and wireless connections. In some implementations, one or more devices of environment 400 may be physically integrated in, and/or may be physically attached to, one or more other devices of environment 400.

UE 405 may include any computation and communication device that is capable of communicating with one or more networks (e.g., network 420). For example, UE 405 may include a device that receives content, such as web pages (e.g., that include text content and/or image content), streaming audio and/or video content, and/or other content, via an Internet connection and/or via some other delivery technique. UE 405 may also receive user interactions (e.g., voice input, touches on a touchscreen, "clicks" via an input device such as a mouse, etc.). In some implementations, UE 405 may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

IRRS 410 may include one or more devices (e.g., a server device or a distributed set of devices, such as a cloud computing system) that perform one or more actions described herein. For example, IRRS 410 may identify the occurrence of network events, types of the network events, attributes of the network events, and remediation options for the network events, in accordance with some embodiments. IRRS 410 may communicate with one or more other devices or systems in order to facilitate the operation of IRRS 410. For example, IRRS 410 may obtain information about network devices or other apparatus (e.g., base stations, routers, fibers, etc.) from network 420, UE 405, and/or some other device or system. IRRS 410 may, in some embodiments, receive information regarding past network events from RIR 415, and/or may provide information regarding the remediation of a given network event to RIR 415. IRRS 410 may use machine learning and/or other techniques to identify the occurrence of network events, types of the network events, attributes of the network events, and/or remediation options for the network events. For example, IRRS 410 may use information regarding past network events (e.g., as received from RIR 415) to identify remediation options that may have a relatively high likelihood of success (e.g., based on remedial measures performed for similar network events in the past).

RIR 415 may include one or more devices (e.g., a server device or a distributed set of devices, such as a cloud computing system) that perform one or more actions described herein. For example, RIR 415 may store information regarding the remediation of network events. The information may include, for example, attributes of the network events, remedial measures that were taken to remediate the network conditions, and/or other suitable information as described herein. The information stored by RIR 415 may be used for machine learning and/or other techniques (e.g., as implemented by IRRS 410, as described herein).

Network 420 may include one or more RANs, via which UEs 405 may access one or more other networks or devices, a core network of a wireless telecommunications network, an Internet Protocol ("IP")-based packet data network ("PDN"), a wide area network ("WAN") such as the Internet, a private enterprise network, and/or one or more other networks. In some implementations, network 420 may be, include, or be in communication with a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. User device 405 may connect to, and/or otherwise communicate with, via network 420, data servers, application servers, other UEs 405, etc. Network 420 may be connected to, and/or otherwise in communication with, one or more other networks, such as a public switched telephone network ("PSTN"), a public land mobile network ("PLMN"), and/or another network.

Figure 5:
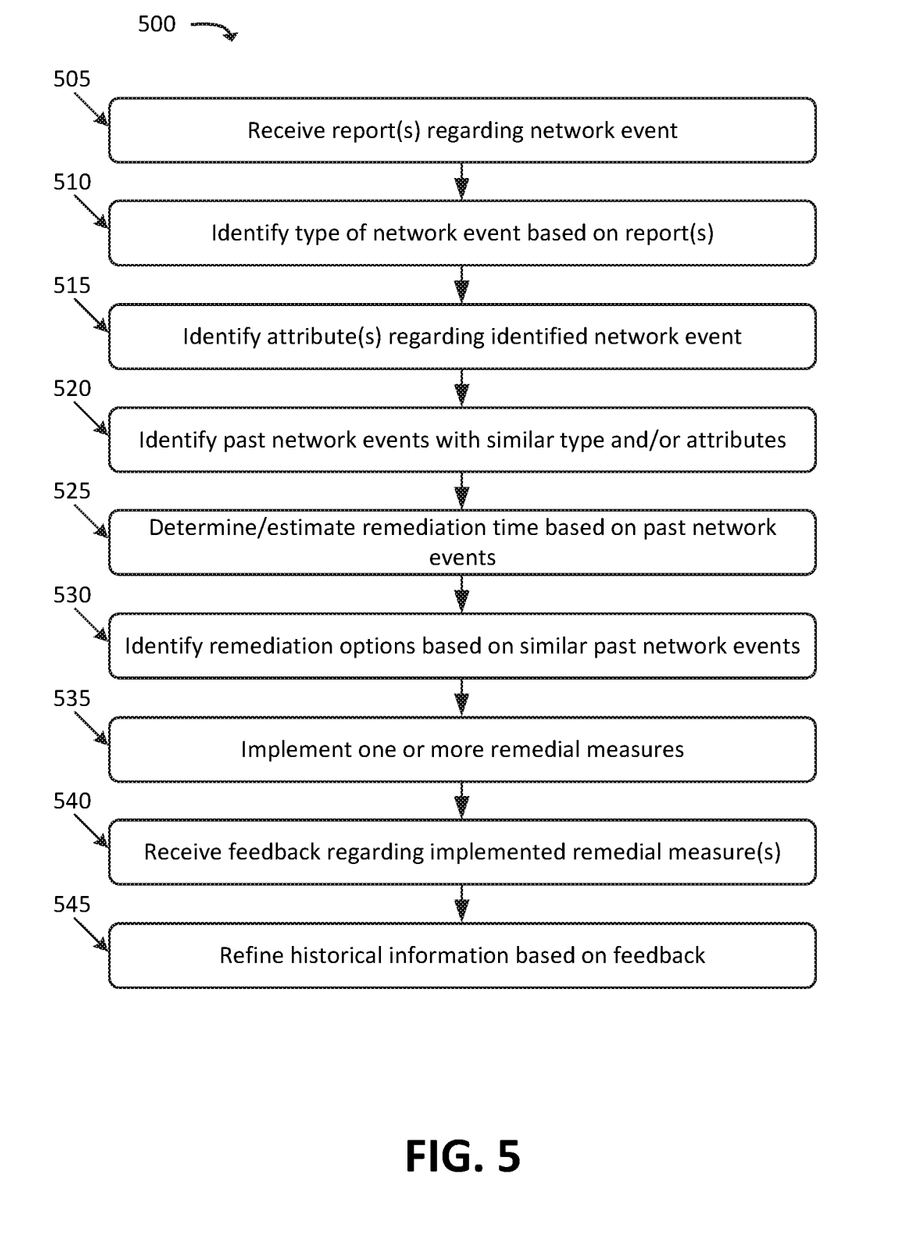
FIG. 5 illustrates an example process for using machine learning techniques to identify a network event and automatically initiate remediation of the network event.

FIG. 5 illustrates an example process 500 for using machine learning techniques to identify a network event and automatically initiate remediation of the network event, in accordance with some embodiments. In some embodiments, process 500 may be performed by IRRS 410. In some embodiments, process 500 may be performed by one or more other devices in addition to, or in lieu of, IRRS 410.

As shown, process 500 may include receiving (at 505) one or more reports regarding a network event. For example, as discussed above, IRRS 410 may receive user-submitted reports, system-generated alerts, routine diagnostic and/or monitoring reports, etc. IRRS 410 may receive the reports from one or more UEs 405, network 420, and/or one or more other devices or systems.

Process 500 may also include identifying (at 510) a type of the network event based on the received reports. For example, as discussed above, IRRS 410 may identify the type of the network event based on attributes associated with the reports, such as an identity of the source(s) of the reports (e.g., identifying information associated UEs 405 that submitted the reports, such as Mobile Directory Number ("MDN"), International Mobile Subscriber Identity ("IMSI"), International Mobile Station Equipment Identity ("IMEI"), etc.), a geographic location associated with the reports (e.g., as indicated in the reports, and/or geographic locations associated with devices or users who submitted the reports), etc.

Process 500 may further include identifying (at 515) attributes associated with the network event. For example, as discussed above, different network events may be associated with different attributes. IRRS 405 may determine these attributes based on information provided in the reports, and/or based on further analysis (e.g., by communicating with network 420 to obtain additional information regarding the network event).

Process 500 may additionally include identifying (at 520) past network events with the same or similar type and/or attributes. For example, as discussed above, IRRS 410 may communicate with RIR 415, network 420, and/or one or more other devices or systems to identify past network events that are associated with the same or similar type and/or attributes as the network event (identified at 510). As mentioned above, "similarity" of the attributes of past network events may be determined using one or more suitable techniques, such as regression analysis, clustering, pattern-matching, etc.

Process 500 may also include determining and/or estimating (at 525) a remediation time based on the identified past network events. For example, as discussed above, IRRS 410 may determine and/or estimate a remediation time based on how long similar network events took to remediate. As also mentioned above, the similarity of the previous network events to the present network event may affect a range of the estimate (e.g., where past network events with a higher degree of similarity may yield a more precise estimate (e.g., with a smaller range), while past network events with a lower degree of similarity may yield a less precise estimate (e.g., with a larger range). IRRS 410 may, in some embodiments, communicate with RIR 415 to determine the remediation times of the previous network events.

Process 500 may further include identifying (at 530) one or more remediation options based on the similar past network events. For example, as discussed above, IRRS 410 may determine one or more remediation options based on remedial measures that were successfully taken to remediate the past network events. In some embodiments, IRRS 410 may identify remedial measures that were unsuccessful and/or took excessive time to remediate the past network events, and may avoid selecting these options, and/or may favor the selection of different remedial measures. As mentioned above, in some embodiments, IRRS 410 may select multiple remedial measures to take.

Process 500 may additionally include implementing (at 535) the one or more remedial measures. For example, as discussed above, IRRS 410 may implement the one or more remedial measures in a suitable manner (e.g., by instructing one or more devices or systems to modify a configuration, instructing one or more devices or systems to perform some other process, notifying a technician of the remedial measure, etc.). As also discussed above, IRRS 410 may notify one or more affected users (or users who are likely to be affected by the network event) regarding the estimated time to remediate the network event.

Process 500 may also include receiving (at 540) feedback regarding the implemented remedial measure(s). For example, as discussed above, IRRS 410 may receive reports, alerts, monitoring and/or diagnostic results, etc., indicating whether the remedial measure was completed or not, and/or an amount of time that was taken to remediate the network condition. As also discussed above, the absence of reports, alerts, etc. may also indicate the successful remediation of the network condition.

Process 500 may further include refining (at 545) historical information based on the feedback. For example, as discussed above, IRRS 410 may modify and/or store information in RIR 415, based on the feedback. For example, the historical information may be modified based on whether the remediation was performed successfully and/or in a timely manner (e.g., within the estimated remediation time, faster, and/or slower). The modified historical information may be used, for example, in subsequent iterations of process 500.

Figure 6:
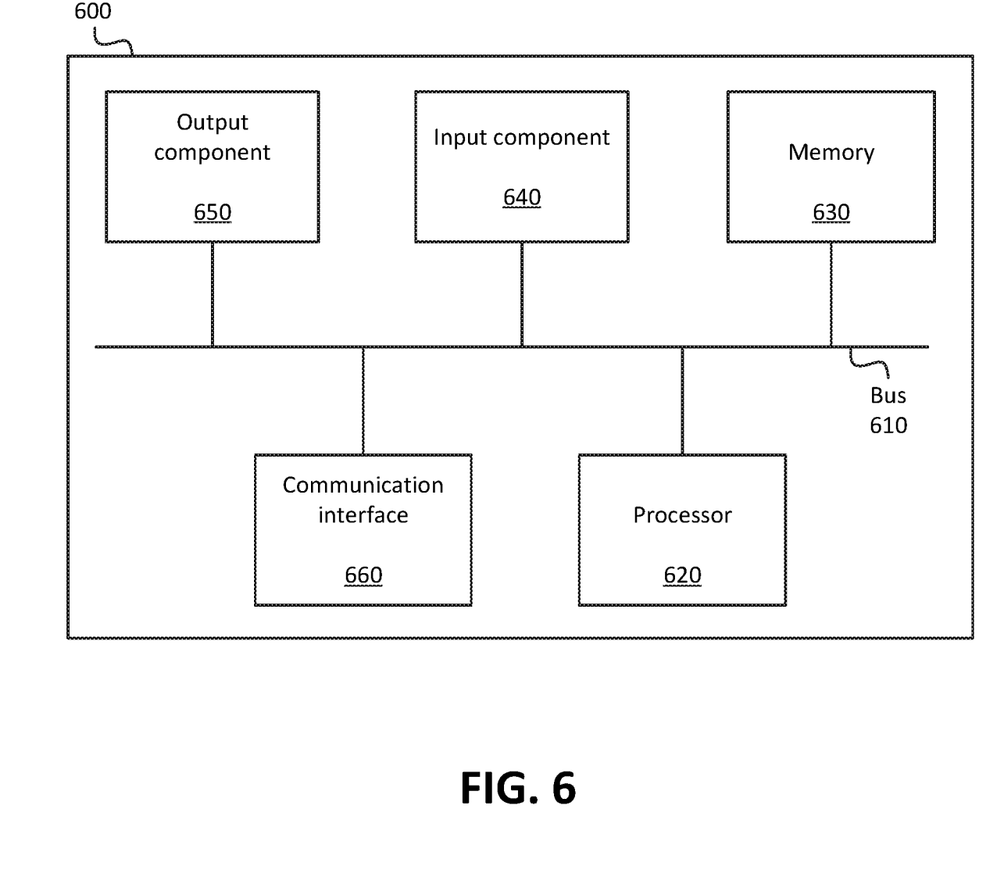
FIG. 6 illustrates example components of one or more devices, according to one or more embodiments described herein.

FIG. 6 illustrates example components of device 600. One or more of the devices described above may include one or more devices 600. Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description but is not intended to be exhaustive or to limit the possible implementations to the precise form disclosed. Modifications and variations are possible in light of the above disclosure or may be acquired from practice of the implementations.

For example, while series of blocks, signals, and/or operations have been described herein (e.g., with regard to FIGS. 1-3 and 5), the order of the blocks, signals, and/or operations may be modified in other implementations. Further, non-dependent blocks, signals, and/or operations may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that, the term "greater than" (or similar terms) is used hereinto describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a non-transitory computer-readable medium storing a set of processor-executable instructions; and one or more processors configured to execute the set of processor-executable instructions, wherein executing the set of processor-executable instructions causes the one or more processors to:
  receive information regarding a first network event;
  identify, based on the received information, one or more attributes of the first network event, wherein identifying the one or more attributes of the first network event includes identifying that the first network event includes a failure associated with a radio of a first base station;
  identify one or more second network events that have previously been remediated and that have one or more attributes that match the one or more attributes of the first network event;
  identify one or more remedial measures to remediate the first network event based on the one or more second network events;
  estimate an amount of time to remediate the first network event using the identified one or more remedial measures;
  implement the one or more remedial measures to remediate the first network event, wherein implementing the one or more remedial measures includes:
    selecting a second base station based on proximity of a coverage area of the second base station to a coverage area of the first base station;
    determining modified configuration parameters for the second base station, to modify the coverage area of the second base station; and
    outputting the modified configuration parameters to the second base station, wherein the second base station modifies the coverage area of the second base station based on the modified configuration parameters;
  determine, after the first network event is remediated, whether the first network event was remediated within the estimated amount of time; and
  store information indicating whether the first network event was remediated within the estimated amount of time, wherein the stored information is used in a subsequent estimation of remediation time of a third network event that has one or more attributes matching the one or more attributes of the first network event.

2. The device of claim 1, wherein the one or more second network events include a failure associated with a radio of a third base station, wherein executing the set of processor-executable instructions further causes the one or more processors to identify that a modification to configuration parameters for a fourth base station was implemented to remediate the one or more second network events,
  wherein the identified one or more remedial measures to remediate the first network event include the modification to the configuration parameters for the second base station, based on a determination that the modification to the configuration parameters for the fourth base station was implemented to remediate the one or more second network events.

3. The device of claim 1, wherein executing the set of processor-executable instructions, to identify the one or more second network events that have one or more attributes that match the one or more attributes of the first network event, further causes the one or more processors to:
  determine a measure of similarity between the one or more attributes of the one or more second network events and the one or more attributes of the first network event; and
  determine that the measure of similarity exceeds a threshold measure of similarity.

4. The device of claim 1, wherein executing the set of processor-executable instructions further causes the one or more processors to:
  identify a plurality of network devices affected by the first network event;
  identify respective contact information for each of the plurality of network devices; and
  output a notification, to the plurality of network devices and using the respective contact information for the plurality of network devices, indicating the estimated amount of time to remediate the first network event.

5. The device of claim 4, wherein executing the set of processor-executable instructions, to identify the plurality of network devices affected by the network event, further causes the one or more processors to:
  identify a geographical region with which the first network event is associated, wherein the geographical region is based on at least one of:
    a geographical location of the first base station, or
    the coverage area of the first base station; and
  identify that the plurality of network devices are located within the geographical region associated with the first network event.

6. The device of claim 1,
  wherein executing the set of processor-executable instructions, to receive the information regarding the first network event, further causes the one or more processors to receive a plurality of reports submitted by a plurality of users,
  wherein executing the set of processor-executable instructions further causes the one or more processors to identify a geographical region associated with the plurality of users, and
  wherein executing the set of processor-executable instructions, to identify the one or more attributes of first network event, further causes the one or more processors to identify that a particular attribute of the first network event is associated with the geographical region.

7. The device of claim 1, wherein the one or more processors are further configured to:
  determine that the estimated amount of time has elapsed after outputting the modified configuration parameters to the second base station; and
  instruct the second base station to revert the modified configuration parameters based on determining that the estimated amount of time has elapsed after outputting the modified configuration parameters to the second base station.

8. A non-transitory computer-readable medium, storing a plurality of processor-executable instructions, which, when executed by one or more processors, causes the one or more processors to:
  receive information regarding a first network event, wherein identifying the one or more attributes of the first network event includes identifying that the first network event includes a failure associated with a radio of a first base station;
  identify, based on the received information, one or more attributes of the first network event;

identify one or more second network events that have previously been remediated and that have one or more attributes that match the one or more attributes of the first network event;

identify one or more remedial measures to remediate the first network event based on the one or more second network events;

estimate an amount of time to remediate the first network event using the identified one or more remedial measures;

implement the one or more remedial measures to remediate the first network event, wherein implementing the one or more remedial measures includes:

selecting a second base station based on proximity of a coverage area of the second base station to a coverage area of the first base station;

determining modified configuration parameters for the second base station, to modify the coverage area of the second base station; and outputting the modified configuration parameters to the second base station, wherein the second base station modifies the coverage area of the second base station based on the modified configuration parameters;

determine, after the first network event is remediated, whether the first network event was remediated within the estimated amount of time; and store information indicating whether the first network event was remediated within the estimated amount of time, wherein the stored information is used in a subsequent estimation of remediation time of a third network event that has one or more attributes matching the one or more attributes of the first network event.

9. The non-transitory computer-readable medium of claim 8, wherein the one or more second network events include a failure associated with a radio of a third base station, wherein the processor-executable instructions further include processor-executable instructions to identify that a modification to configuration parameters for a fourth base station was implemented to remediate the one or more second network events, wherein the identified one or more remedial measures to remediate the first network event include the modification to the configuration parameters for the second base station, based on a determination that the modification to the configuration parameters for the fourth base station was implemented to remediate the one or more second network events.

10. The non-transitory computer-readable medium of claim 8, wherein the processor-executable instructions, to identify the one or more second network events that have one or more attributes that match the one or more attributes of the first network event, further include processor-executable instructions to:

determine a measure of similarity between the one or more attributes of the one or more second network events and the one or more attributes of the first network event; and determine that the measure of similarity exceeds a threshold measure of similarity.

11. The non-transitory computer-readable medium of claim 8, wherein the processor-executable instructions further include processor-executable instructions to:

identify a plurality of network devices affected by the first network event;

identify respective contact information for each of the plurality of network devices; and output a notification, to the plurality of network devices and using the respective contact information for the plurality of network devices, indicating the estimated amount of time to remediate the first network event.

12. The non-transitory computer-readable medium of claim 11, wherein the processor-executable instructions, to identify the plurality of network devices affected by the network event, further include processor-executable instructions to:

identify a geographical region with which the first network event is associated wherein the geographical region is based on at least one of:

a geographical location of the first base station, or the coverage area of the first base station; and identify that the plurality of network devices are located within the geographical region associated with the first network event.

13. The non-transitory computer-readable medium of claim 8, wherein the processor-executable instructions, to receive the information regarding the first network event, further include processor-executable instructions to receive a plurality of reports submitted by a plurality of users, wherein the processor-executable instructions further include processor-executable instructions to identify a geographical region associated with the plurality of users, and wherein the processor-executable instructions, to identify the one or more attributes of first network event, further include processor-executable instructions to identify that a particular attribute of the first network event is associated with the geographical region.

14. A method, comprising:

receiving information regarding a first network event;

identifying, based on the received information, one or more attributes of the first network event, wherein identifying the one or more attributes of the first network event includes identifying that the first network event includes a failure associated with a radio of a first base station;

identifying one or more second network events that have previously been remediated and that have one or more attributes that match the one or more attributes of the first network event;

identifying one or more remedial measures to remediate the first network event based on the one or more second network events;

estimating an amount of time to remediate the first network event using the identified one or more remedial measures;

implementing the one or more remedial measures to remediate the first network event, wherein implementing the one or more remedial measures includes:

selecting a second base station based on proximity of a coverage area of the second base station to a coverage area of the first base station;

determining modified configuration parameters for the second base station, to modify the coverage area of the second base station; and outputting the modified configuration parameters to the second base station, wherein the second base station modifies the coverage area of the second base station based on the modified configuration parameters;

implement the one or more remedial measures to remediate the first network event;

determining, after the first network event is remediated, whether the first network event was remediated within the estimated amount of time; and storing information indicating whether the first network event was remediated within the estimated amount of time, wherein the stored information is used in a subsequent estimation of remediation time of a third network event that has one or more attributes matching the one or more attributes of the first network event.

15. The method of claim 14, wherein the one or more second network events include a failure associated with a radio of a third base station, the method further comprising identifying that a modification to configuration parameters for a fourth base station was implemented to remediate the one or more second network events, wherein the identified one or more remedial measures to remediate the first network event include the modification to the configuration parameters for the second base station, based on a determination that the modification to the configuration parameters for the fourth base station was implemented to remediate the one or more second network events.

16. The method of claim 14, wherein identifying the one or more second network events that have one or more attributes that match the one or more attributes of the first network event includes:

determining a measure of similarity between the one or more attributes of the one or more second network events and the one or more attributes of the first network event; and determining that the measure of similarity exceeds a threshold measure of similarity.

17. The method of claim 14, further comprising:

identifying a plurality of network devices affected by the first network event;

identifying respective contact information for each of the plurality of network devices; and outputting a notification, to the plurality of network devices and using the respective contact information for the plurality of network devices, indicating the estimated amount of time to remediate the first network event.

18. The method of claim 17, further comprising:

identifying a geographical region with which the first network event is associated, wherein the geographical region is based on at least one of:

a geographical location of the first base station, or the coverage area of the first base station; and identifying that the plurality of network devices are located within the geographical region associated with the first network event.

19. The method of claim 14, wherein receiving the information regarding the first network event further includes receiving a plurality of reports submitted by a plurality of users, wherein the method further comprises identifying a geographical region associated with the plurality of users, and wherein identifying the one or more attributes of first network event further includes identifying that a particular attribute of the first network event is associated with the geographical region.

20. The method of claim 14, further comprising:

determining that the estimated amount of time has elapsed after outputting the modified configuration parameters to the second base station; and instructing the second base station to revert the modified configuration parameters based on determining that the estimated amount of time has elapsed after outputting the modified configuration parameters to the second base station.

* * * * *